(12) United States Patent
Barnett

(10) Patent No.: US 7,328,481 B2
(45) Date of Patent: Feb. 12, 2008

(54) HINGES AND ASSOCIATED DEVICES

(75) Inventor: Ricky Barnett, Herts (GB)

(73) Assignee: Nokia Corporation, Espoo (FI)

( * ) Notice: Subject to any disclaimer, the term of this patent is extended or adjusted under 35 U.S.C. 154(b) by 326 days.

(21) Appl. No.: 11/077,674

(22) Filed: Mar. 10, 2005

(65) Prior Publication Data

US 2006/0200946 A1 Sep. 14, 2006

(51) Int. Cl.
*E05D 1/00* (2006.01)

(52) U.S. Cl. .................... 16/227; 379/433.13

(58) Field of Classification Search .............. 16/227, 16/226, 225, 234, 354, 365, 366, 368, 369; 160/135; 379/433.12, 433.13; 361/680, 361/681–683; 455/575.1, 575.3, 575.8, 550.1, 455/90.3; 348/373, 794, 333.06
See application file for complete search history.

(56) References Cited

U.S. PATENT DOCUMENTS

| | | | | | |
|---|---|---|---|---|---|
| 1,944,696 | A | * | 1/1934 | Reichl ................. | 160/231.1 |
| 3,501,800 | A | * | 3/1970 | O'Dea .................. | 16/227 |
| 4,163,303 | A | * | 8/1979 | Hanna .................. | 16/227 |
| 4,558,911 | A | * | 12/1985 | Ruoff ................... | 439/13 |
| 4,885,430 | A | * | 12/1989 | Kinser et al. ......... | 361/749 |
| 5,048,585 | A | * | 9/1991 | Miller .................. | 160/135 |
| 5,278,993 | A | * | 1/1994 | Reiff et al. ............ | 455/575.3 |
| 5,410,779 | A | * | 5/1995 | Esman et al. .......... | 16/370 |
| 5,732,757 | A | * | 3/1998 | Mariol ................. | 160/135 |
| 5,987,704 | A | * | 11/1999 | Tang .................... | 16/534 |
| 6,154,359 | A | * | 11/2000 | Kamikakai et al. .... | 361/681 |
| 6,926,546 | B2 | * | 8/2005 | Kurokawa ............. | 439/165 |
| 6,968,056 | B2 | * | 11/2005 | Barnett et al. ........ | 379/433.13 |
| 7,082,318 | B2 | * | 7/2006 | Wilson ................. | 455/500.1 |

FOREIGN PATENT DOCUMENTS

| | | | |
|---|---|---|---|
| EP | 612904 A2 | * | 8/1994 |
| EP | 1659764 A1 | * | 5/2006 |
| GB | 2189290 A | * | 10/1987 |
| GB | 2203190 A | * | 10/1988 |
| GB | 2254881 A | * | 10/1992 |
| GB | 2363821 A | * | 1/2002 |
| JP | 2001262747 A | * | 9/2001 |

* cited by examiner

*Primary Examiner*—Chuck Y. Mah
(74) *Attorney, Agent, or Firm*—Harrington & Smith, PC

(57) ABSTRACT

The present invention provides a hinge mechanism for allowing relative movement between a first and a second member of a device, the hinge mechanism arranged to connect the first device member about a first pivot axis and the second device member about a second pivot axis, and wherein the hinge mechanism comprises a synchronization mechanism having a strap arranged to provide connection of the first and second device members across an imaginary line between the first and second pivot axes to provide joint movement about both first and second pivot axes during operation of the hinge.

26 Claims, 5 Drawing Sheets

HINGES AND ASSOCIATED DEVICES

FIELD OF THE INVENTION

The present invention relates to hinge mechanism, and devices having such mechanisms. In particular, it relates to hinge mechanisms having two pivot axes about which the hinge mechanism can operate.

Specific embodiments of the present invention relate to transformable devices having mobile phone functionality e.g. a cellular mobile phone. For simplicity, much of the foregoing description will concentrate on cellular mobile phones, which have open and closed positions provided by a hinge mechanism having two pivot axes.

Devices having hinges according to the claimed invention need not be electronic devices, or electronic devices having mobile phone functionality.

BACKGROUND TO THE INVENTION

A hinge mechanism having two pivot axes is known. The two halves of the hinge mechanism are joined by a longitudinally extending link, each end of the link being joined to one of the two halves along a pivot axis.

Movement about each of the pivot axes is independent. In practise, one pivot will require a lower torque than the other pivot to enable movement about that pivot. Therefore, movement will be first about the lower torque pivot and once the end of the travel about the first pivot has been reached, movement will be about the second higher torque pivot. The operation of such a mechanism does not provide controlled simultaneous movement about two pivot axes.

Gearing can be used to provide synchronization so that movement of about both pivots can occur at the same time. Such arrangements are complex.

SUMMARY OF THE INVENTION

According to the present invention, there is provided a hinge mechanism for allowing relative movement between a first and a second member of a device, the hinge mechanism arranged to connect the first device member about a first pivot axis and the second device member about a second pivot axis, and wherein the hinge mechanism comprises a synchronization mechanism having a strap arranged to provide connection of the first and second device members across an imaginary line between the first and second pivot axes to provide joint movement about both first and second pivot axes during operation of the hinge.

The strap of the synchronization mechanism provides connection across the imaginary line between the first and second pivot axes, and forces joint movement about both pivot axes during operation of the hinge mechanism. This can lead to a smoothly operating hinge mechanism. The arrangement is simple.

The hinge mechanism may comprise an arrangement to alternately pivot about the two pivot axes without the provision of a synchronization mechanism.

The synchronization mechanism may be arranged to allow equal movement about the first and second axes during operation of the hinge.

The synchronization mechanism may be arranged to allow simultaneous movement about the first and second axes during operation of the hinge.

The relative movement between the first and second members may provide one configuration in which the first and second members each have a surface which faces inwardly towards each other and opposing surfaces which face outwardly away from each other, and wherein one end of the strap is connected to a inwardly facing surface on one of the members of the device, and the other end of the strap is connected to a opposing outwardly facing surface on the other member of the device.

The synchronization mechanism may comprise a first and second strap to connect the first and second device members across an imaginary line between the first and second pivot axes, and wherein the first and second strap provide connection across the imaginary line in opposing directions.

The relative movement between the first and second members may provide one configuration in which the first and second members each have a surface which faces inwardly towards each other and opposing surfaces which face outwardly away from each other, and wherein one end of the first strap is connected to a inwardly facing surface on the first members of the device, and the other end of the first strap is connected to a opposing outwardly facing surface on the second member of the device, and wherein one end of the second strap is connected to an outwardly facing surface on the first member of the device and the other end of the second strap is connected to an inwardly facing surface on the second member of the device.

The strap may be made from a durable flat material. The strap may be made from a material of sufficient stiffness to provide joint movement about the first and second axes.

The relative movement between the first and second members may provide a plurality of configurations, including an open and a closed configuration. The open configuration may permit user access to a user interface on the device and the closed configuration may prevent user access to the user interface.

The relative movement between the first and second members may provide folding of the first and second members onto each other about the pivot axes.

The relative movement between the first and second members may provide a plurality of configuration which fold the first and second members about the pivot axes to provide a first configuration in which a surface of each of the members faces towards each other and a second configuration in which the surfaces face away from each other. In the second configuration, the second pivot axes may have moved 180° to the first pivot axes as compared to the position in the first configuration.

The relative movement between the first and second members may provide a plurality of configurations, one or more of the positions being a locked position. One locked position may be provided when the second pivot axes has moved 90° to the first pivot axes as compared to the position in a first configuration.

One locked position may be provided when the second pivot axes has moved 180° to the first pivot axes as compared to the position in a first configuration.

The first and second pivot axes may be connected by a link member between the first and second members, the link member sharing common pivot axes with the first and second members.

The link member may be provided towards a central region of the hinge along the folding axes. The link member may be provided at the centre of the hinge along the folding axes.

The first and second members may have one or more recesses to accommodate a end portion of the link member.

The link member may be provided towards an outer region of the hinge along the folding axes.

Two link members may be positioned to connect lateral sides of the first and second members.

One or more embodiments may be used in various combinations. The invention also encompasses a device comprising a hinge mechanism according to the first aspect, an electronic device comprising a hinge mechanism according to the first aspect, and a mobile telephone comprising a hinge mechanism according to the first aspect.

BRIEF DESCRIPTION OF THE FIGURES

Specific embodiment of the present invention will be described with reference to the following Figures in which.

SPECIFIC EMBODIMENTS

Figure 1A:
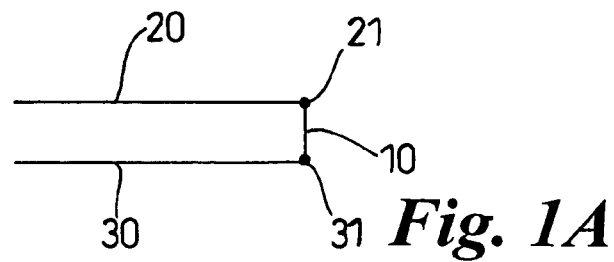
FIG. 1 is a schematic line body illustration showing a two pivot axis central link hinge mechanism according to the prior art in five sequential configurations.

Consider a prior art hinge configuration (FIG. 1) of a first half 20 and a second half 30 of a device each pivotably joined at one end 21, 31 by one end of a longitudinally extending link member 10, i.e. one end of the link 10 is pivotably joined 21 to the first half 20 and the other opposing end of the link 10 is pivotably joined 31 to the second half 30.

The starting position of the hinge configuration is like a closed clamshell, with each of the two halves facing and touching one another. The hinge configuration is arranged such that movement is first provided about hinge 31, to provide the arrangement shown in FIG. 1B, in which the first half 20 has moved 90° in a clockwise direction to the second half 30. The first and second halves are now perpendicular to one another.

Figure 1B:
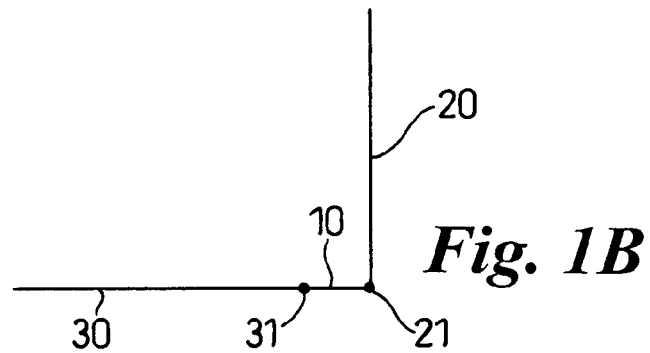
Figure 1C:
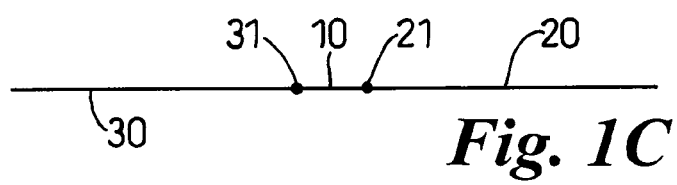

The next movement is about pivot 21 to provide a fully open clamshell in which the first half 20 has moved another 90° in a clockwise direction to the second half 30 from the configuration of FIG. 1B, to provide the configuration of FIG. 1C.

Figure 1D:
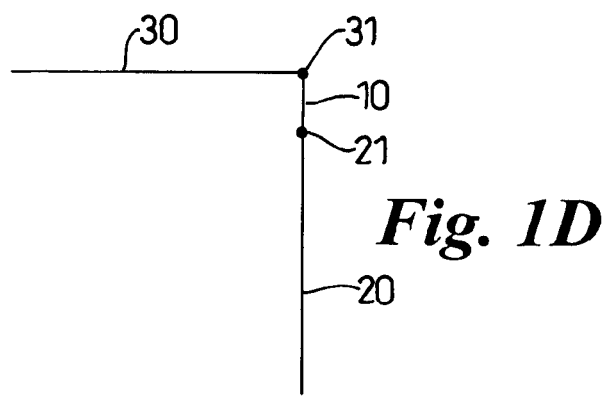
Figure 1E:
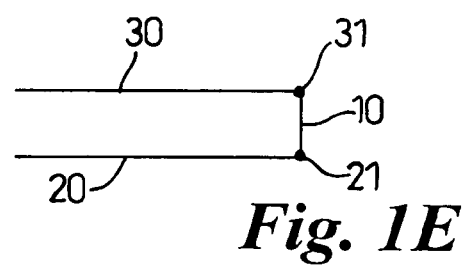

This next movement is about pivot 31 to provide the configuration of FIG. 1D and finally the movement is about pivot 21 to provide a inverse clamshell arrangement as shown in FIG. 1E.

This can be considered to be a stepped operation in which movement takes place alternately about pivot 31, 21, 31, 21. Closing of the device occurs in a reverse manner i.e. movement about pivot 21, 31, 21, 31.

It will be appreciated that the configuration allows for 360° relative rotation of the first and second halves 20, 30 (compare FIGS. 1A and 1E). Such a mechanism can include locking positions so that specific configurations of the device, such as the configuration of FIGS. 1A-1E, are firmly held in position. Locking positions can be provided by cam/rider arrangements, which are known in the art.

According to one embodiment of the present invention, such a hinge mechanism, which is arranged to operate in the described stepped arrangement, is modified to comprise two straps (FIGS. 2 and 3) attached to the two halves.

Figure 2:
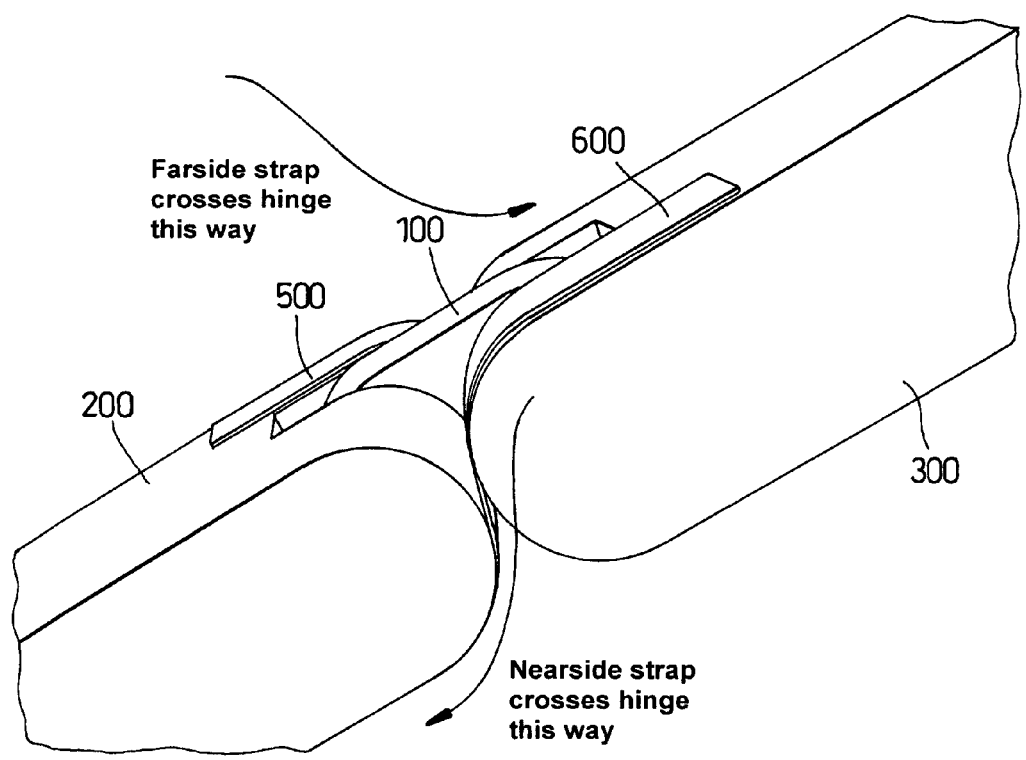
FIG. 2 is a lateral perspective view of a hinge mechanism according to the present invention.
Figure 3:
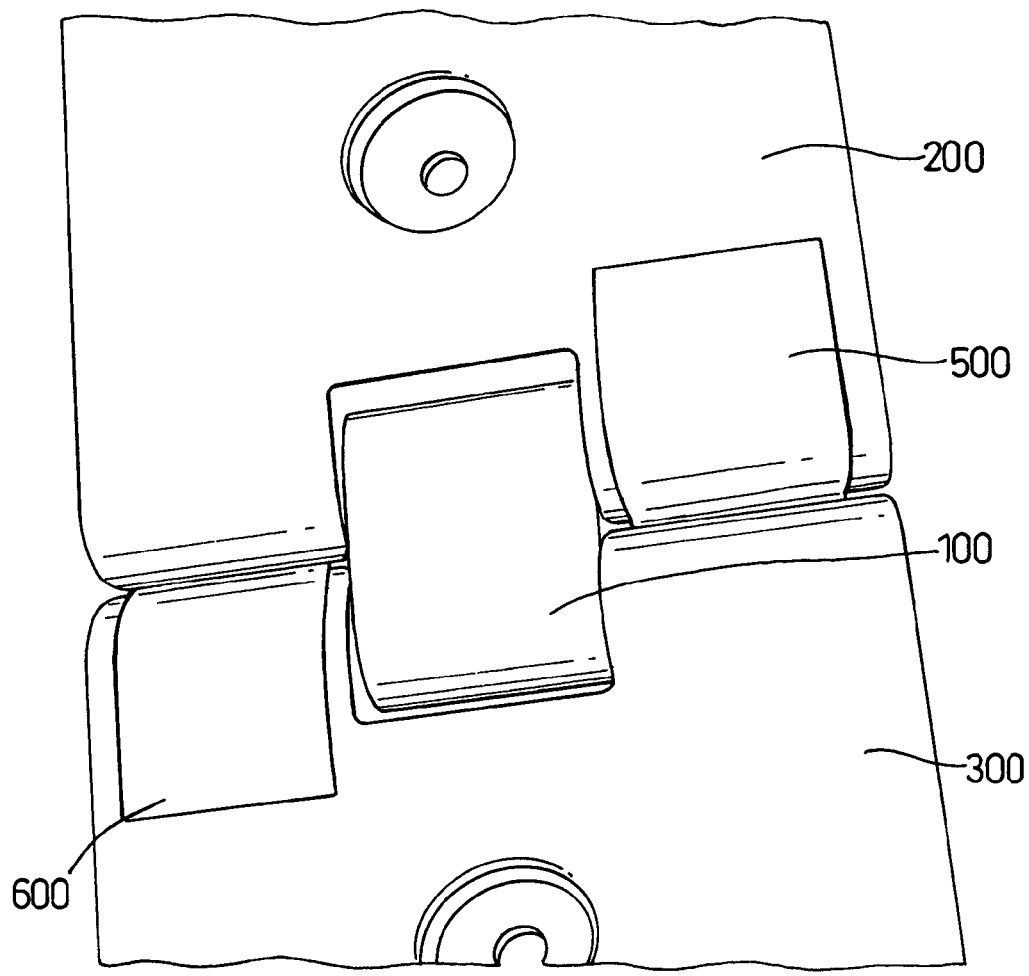
FIG. 3 is a front/rear view of the hinge mechanism of FIG. 2.
Figure 4A:
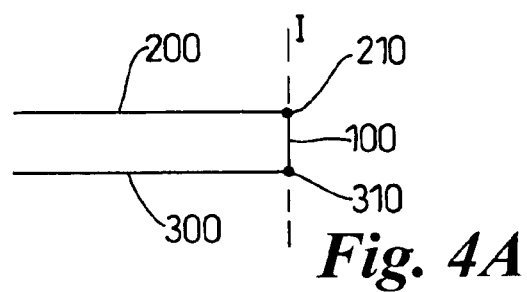
FIG. 4 is a comparative line body illustration to FIG. 1, showing the five configurations according to one embodiment of the present invention.
Figure 4B:
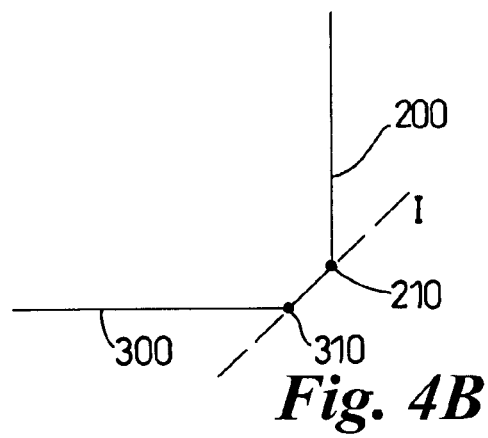
Figure 4C:
Figure 4D:
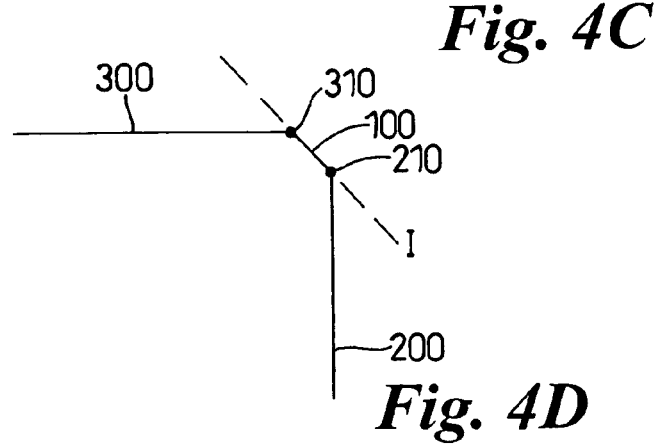
Figure 4E:
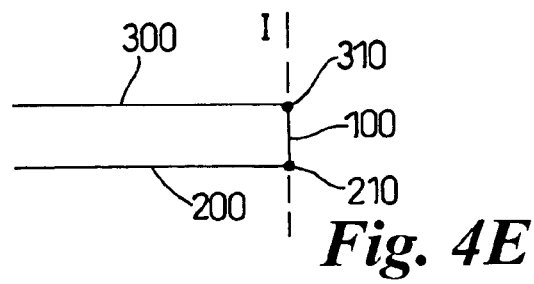
Figure 5A:
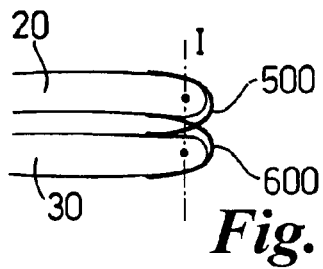
FIG. 5 is side view full body illustration, with the link of the hinge mechanism removed, to show the synchronization mechanism according to the present invention in the corresponding five configurations of FIG. 4.
Figure 5B:
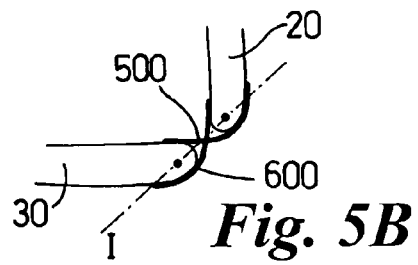
Figure 5C:
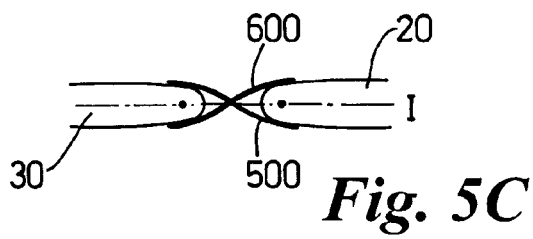
Figure 5D:
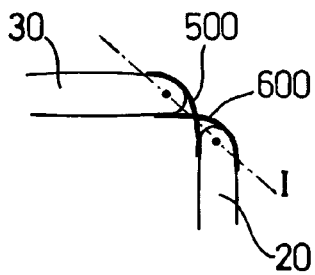
Figure 5E:
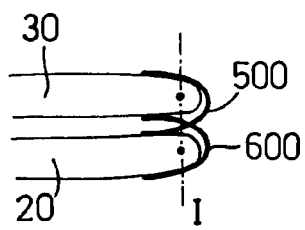

FIGS. 2 and 3 show a device comprising features of the invention. The device, in this embodiment, is an electronic device. More specifically, the device is a mobile telephone which comprises a hinge or hinge mechanism according to features of the invention. The device according to one embodiment of the present invention comprises two halves 200, 300 connected by a central link 100. The central link 100 is connected to half 200 via pivot point 210 located at one end of the link 100. The opposing end of the link 100 is connected via pivot point 310 to half 300. Recesses are provided to house the ends of the link 100 in the halves 200, 300. The link connection ends of the halves 200, 300 are rounded. The link thickness is comparable to the link depth.

One strap 500 is provided on one side of the central link 100 and another strap 600 is provided on another side of the link 100. The straps 500, 600 are attached to the two halves 200, 300. The distance between the two attachment points of strap 500 is the same as the distance between the two attachment points of strap 600.

The straps 500, 600 each connect to a surface of one half and to a different surface of the other half (FIG. 2). For example, strap 500 connects an inner surface of half 200 with an outer surface of half 300 and strap 600 connects a inner surface of half 300 with an outer surface of have 200. The straps 500, 600 conform to the rounded edges of the halves to form an S and an inverse S shape in profile. The straps 500, 600 can be considered to provide connection across an imaginary line I (see FIGS. 4 and 5) extending between pivot points 210 and 310.

FIG. 4 illustrates the changed movement provided by the synchronization straps 500, 600. Rather than alternate movement (see FIG. 1) as provided in the prior art, the present synchronization straps provide smooth, simultaneous movement about both pivot axes.

The angle between the imaginary line I, and each of the halves 200, 300 is the same in each of the five configurations. For example, in FIG. 4A, the angle between half 200 and the imaginary line is 90°, which is the same as the angle between half 300 and the imaginary line.

One way of viewing the arrangement is to consider that there is a plane connecting the two pivot axis 210, 310, and angular movement about each axis relative to the plane is the same when the halves 200, 300 are moved relative to one another. For example in FIG. 4B, considering the connection between 210 and 310 to define the aforementioned plane, when halves 200 and 300 are moved relative to one another, the angular movement of half 200 with respect to pivot 210, and half 300 with respect to pivot 310 is the same relative to the plane joining 210 and 310.

FIG. 5 shows the varying configuration of the straps as the halves of the device are opened. The link has been removed from the Figure for the purposes of clarity. Although the two halves appear to be spaced apart in the closed positions of FIGS. 5A and 5E, this does not need to be the case.

The straps can be made of sheet metal (e.g. stainless steel), or a fabric (e.g. Kevlar™). The material may be a mesh.

Various modifications can be made to the disclosed embodiments without departing from the scope of the present invention.

For example, two, three or more conveniently positioned straps may be provided according to the particular design of the device. Two or more straps may be placed adjacent to one another rather than being separated by a central link as previously shown.

The link may house cabling for the electrical connection of the two halves of the device through the link. More than one link can be provided. For example, two, three or more links may be provided. One link may be provided along a lateral edge of the device, or two links may be provided on two lateral edges of a device. The link may not be so thick, and may have a thickness which is much less than the depth of the hinge, or vice versa.

The electrical connection may be provided by an optical connection path between the two device halves, which may, or may not, be housed in the link. Various types of locking arrangements can also be used. Locking does not have to occur at 90° positions.

The invention claimed is:

1. A hinge mechanism for allowing relative movement between a first and a second member of a device, the hinge mechanism arranged to connect the first device member about a first pivot axis and the second device member about a second pivot axis, and wherein the hinge mechanism comprises a synchronization mechanism having a first strap and a second strap adapted to connect the first and second device members to each other said first and second straps cross imaginary line between the first and second pivot axes, and a substantially rigid link member located between the first and second straps and adapted to pivotally connect the first and second device members to each other, wherein the hinge mechanism is adapted to allow joint movement of the first and second device members about both the first and second pivot axes during operation of the hinge mechanism.

2. A hinge mechanism according to claim 1, wherein the synchronization mechanism is adapted to allow equal movement about the first and second axes during operation of the hinge mechanism.

3. A hinge mechanism according to claim 1, wherein the synchronization mechanism is adapted to allow simultaneous movement about the first and second axes during operation of the hinge mechanism.

4. A hinge mechanism according to claim 1, wherein the relative movement between the first and second members provide one configuration in which the first and second members each have a surface which faces inwardly towards each other and opposing surfaces which face outwardly away from each other, and wherein one end of the first strap is connected to a inwardly facing surface on one of the members of the device, and the other end of the first strap is connected to a opposing outwardly facing surface on the other member of the device.

5. A hinge mechanism according to claim 1, wherein the first and second straps provide connection across the imaginary line in opposite directions from the imaginary line.

6. A hinge mechanism according to claim 5, wherein the relative movement between the first and second members provide one configuration in which the first and second members each have a surface which faces inwardly towards each other and opposing surfaces which face outwardly away from each other, and wherein one end of the first strap is connected to a inwardly facing surface on the first members of the device, and the other end of the first strap is connected to a opposing outwardly facing surface on the second member of the device, and wherein one end of the second strap is connected to an outwardly facing surface on the first member of the device and the other end of the second strap is connected to an inwardly facing surface on the second member of the device.

7. A hinge mechanism according to claim 1, wherein at least one of the straps is made from a durable flat material.

8. A hinge mechanism according to claim 1, wherein at least one of the straps is made from a material of sufficient stiffness to provide joint movement about the first and second axes.

9. A hinge mechanism according to claim 1, wherein the relative movement between the first and second members provide a plurality of configurations, including an open and a closed configuration.

10. A hinge mechanism according to claim 9, wherein open configuration permits user access to a user interface on the device and the closed configuration prevents user access to the user interface.

11. A hinge mechanism according to claim 1, wherein the relative movement between the first and second members provide folding of the first and second members onto each other about the pivot axes.

12. A hinge mechanism according to claim 1, wherein the relative movement between the first and second members provide a plurality of configurations which fold the first and second members about the pivot axes to provide a first configuration in which a surface of each of the members faces towards each other and a second configuration in which the surfaces face away from each other.

13. A hinge mechanism according to claim 12, wherein, in the second configuration, the second pivot axes has moved 180° to the first pivot axes as compared to the position in the first configuration.

14. A hinge mechanism according to claim 1, wherein the relative movement between the first and second members provide a plurality of configurations, one or more of the positions being a locked position.

15. A hinge mechanism according to claim 14, wherein one locked position is provided when the second pivot axes has moved 90° to the first pivot axes as compared to the position in a first configuration.

16. A hinge mechanism according to claim 14, wherein one locked position is provided when the second pivot axes has moved 180° to the first pivot axes as compared to the position in a first configuration.

17. A hinge mechanism according to claim 1, wherein the link member shares common pivot axes with the first and second members.

18. A hinge mechanism according to claim 17, wherein the link member is provided at the centre of the hinge mechanism along the axes.

19. A hinge mechanism according to claim 17, wherein the first and second members have one or more recesses to accommodate a end portion of the link member.

20. A device comprising a hinge mechanism according to claim 1.

21. An electronic device comprising a hinge mechanism according to claim 1.

22. A mobile telephone comprising a hinge mechanism according to claim 1.

23. An electronic device comprising:
a first housing member;
a second housing member; and
a hinge mechanism movably connecting the first and second housing members to each other, wherein the hinge mechanism is connected to the first housing member about a first pivot axis, wherein the hinge mechanism is connected to the second housing member about a second different pivot axis, and wherein the hinge mechanism comprises a synchronization mechanism having a first strap and a second strap connected to the first and second housing members said first and second straps cross an imaginary line between the first and second pivot axes, and a substantially rigid link member pivotally the first and second housing members to each other and located between the first and second straps, wherein the hinge mechanism is adapted to allow joint movement of the first and second housing members about both the first and second pivot axes.

24. An electronic device as in claim 23 wherein the first and second straps are generally reversely orientated relative to each other.

25. An electronic device as in claim 23:
wherein a first end of the first strap is fixedly attached to a first side of the first housing member,
wherein a first end of the second strap is fixedly attached to a second opposite side of the first housing member,
wherein a second end of the first strap is fixedly attached to a second side of the second housing member, and
wherein a second end of the second strap is connected to first side of the second housing member.

26. An electronic device as in claim 23 wherein the electronic device comprises a mobile telephone.

* * * * *

UNITED STATES PATENT AND TRADEMARK OFFICE
CERTIFICATE OF CORRECTION

| | | |
|---|---|---|
| PATENT NO. | : 7,328,481 B2 | Page 1 of 1 |
| APPLICATION NO. | : 11/077674 | |
| DATED | : February 12, 2008 | |
| INVENTOR(S) | : Barnett | |

It is certified that error appears in the above-identified patent and that said Letters Patent is hereby corrected as shown below:

In The Claims:

Claim 23, column 7, line 2, after "pivotally" insert --connecting--.

Signed and Sealed this

First Day of July, 2008

JON W. DUDAS
*Director of the United States Patent and Trademark Office*